(12) United States Patent
Oh (10) Patent No.: US 12,007,599 B1
(45) Date of Patent: Jun. 11, 2024

(54) DISPLAY WITH A ROBUST PANEL DESIGN

(71) Applicant: DELL PRODUCTS L.P., Round Rock, TX (US)

(72) Inventor: Guentaek Oh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/301,393

(22) Filed: Apr. 17, 2023

(51) Int. Cl.
*F21V 8/00* (2006.01)

(52) U.S. Cl.
CPC ......... *G02B 6/0088* (2013.01); *G02B 6/0068* (2013.01)

(58) Field of Classification Search
CPC .............................. G02B 6/0088; G02B 6/0068
See application file for complete search history.

(56) References Cited

U.S. PATENT DOCUMENTS

| 8,325,937 B2 | 12/2012 | Kuriakose |
| 10,827,243 B1 | 11/2020 | Peana et al. |
| 2015/0029441 A1* | 1/2015 | Kang .................. G02B 6/0091 362/613 |

* cited by examiner

*Primary Examiner* — Mary Ellen Bowman
(74) *Attorney, Agent, or Firm* — Larson Newman, LLP (57) ABSTRACT

A display for an information handling system includes a light guide plate, a bottom cover, and a damper. The damper in physical communication with the light guide plate and with the bottom cover. The damper includes a compression portion and a catch portion. The compression portion deforms in response to a force exerted on the compression portion by the light guide plate. The catch portion includes a first groove that interfaces with an end of the compression portion during a first environmental condition. The first groove holds the end of the compression portion and supports the light guide plate when the display is in a pivot position during the first environmental condition.

20 Claims, 7 Drawing Sheets

DISPLAY WITH A ROBUST PANEL DESIGN

FIELD OF THE DISCLOSURE

The present disclosure generally relates to information handling systems, and more particularly relates to a display with a robust panel design.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display for an information handling system includes a light guide plate, a bottom cover, and a damper. The damper may be in physical communication with the light guide plate and with the bottom cover. The damper includes a compression portion and a catch portion. The compression portion may deform in response to a force exerted on the compression portion by the light guide plate. The catch portion includes a first groove that may interface with an end of the compression portion during a first environmental condition. The first groove may hold the end of the compression portion and support the light guide plate when the display is in a pivot position during the first environmental condition.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
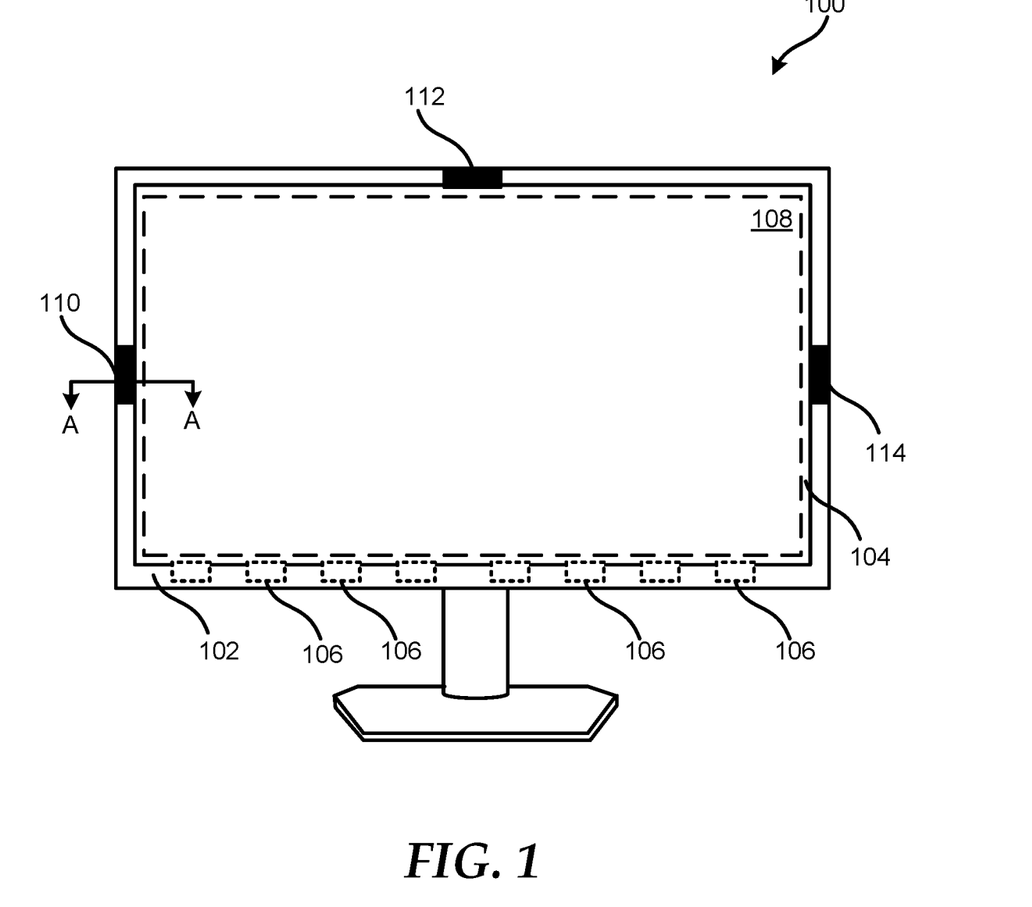
FIGS. 1 and 2 are diagrams of a display of an information handling system according to at least one embodiment of the present disclosure.
Figure 2:
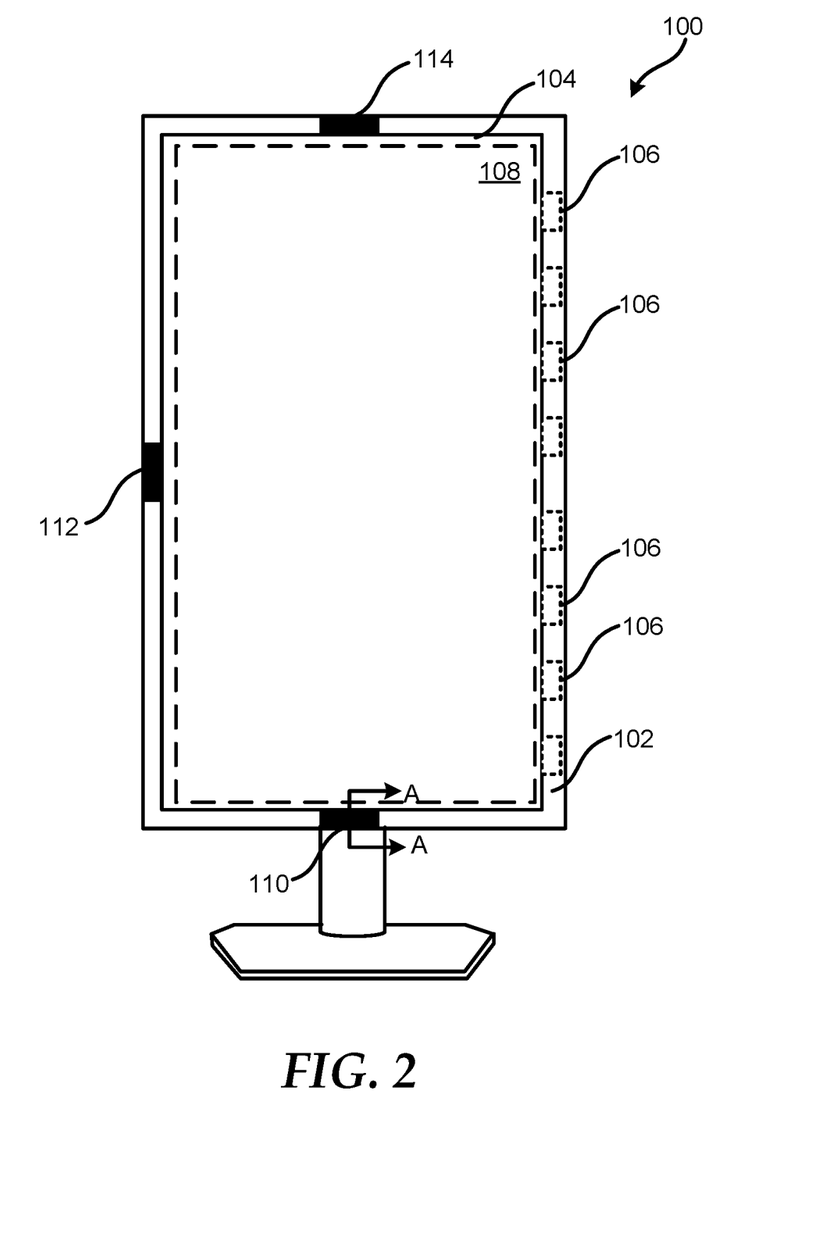

FIGS. 1 and 2 illustrate diagrams of a display 100 of an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Display 100 includes a front panel 102, a display panel 104, multiple light emitting diodes (LEDs) 106, a light guide plate (LGP) 108, and dampers 110, 112, and 114. In an example, display 100 may be an 'all-in-one' system, such that the display may include the components to display images, and the components to perform operations of an information handling system, such as information handling system 900 of FIG. 9. In an example, display 100 may include additional components without varying from the scope of this disclosure. A portion of display 100 taken along line A-A will be described with respect to FIGS. 3 and 4 below.

In an example, LEDs 106 may be located along a first edge of LGP 108 and may provide light to illuminate the LGP. While display 100 is in a landscape orientation as illustrated in FIG. 1, LEDs 106 may be located below LGP 108 and project the light upwards into the LGP. When display 100 is in a pivot position, such as a portrait orientation illustrated in FIG. 2, LEDs 106 may be located on one side of LGP 108. In this situation, gravity may pull LGP 108 downward but LEDs 106 may be securely mounted within panel 102, such that the LEDs do not move. Based on the movement of LGP 108, in previous displays the light projected by LEDs 106 may create hot spots within the LGP and display panel 104. In an example, the hot spots of previous displays may be generated based on a shift of locations for LGP component patterns with respect to LEDs 106. Display 100 may be improved by one of dampers 110, 112, and 114 supporting LGP 108 while the display is in the pivot position or portrait orientation such that the component pattern of the LGP may be held in proper alignment with LEDs 106.

Figure 3:
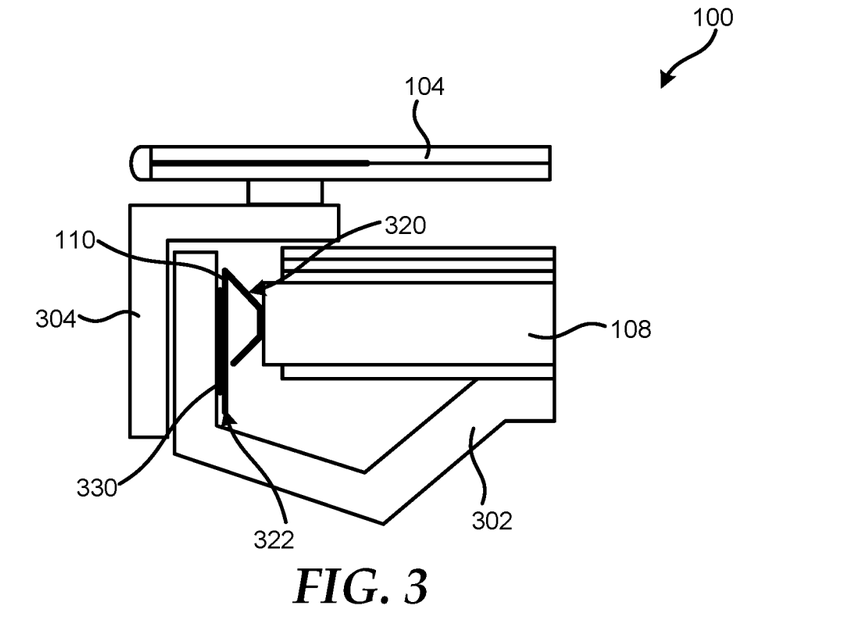
FIGS. 3 and 4 are cross-sectional views of a portion of a display with a damper according to at least one embodiment of the present disclosure.
Figure 4:
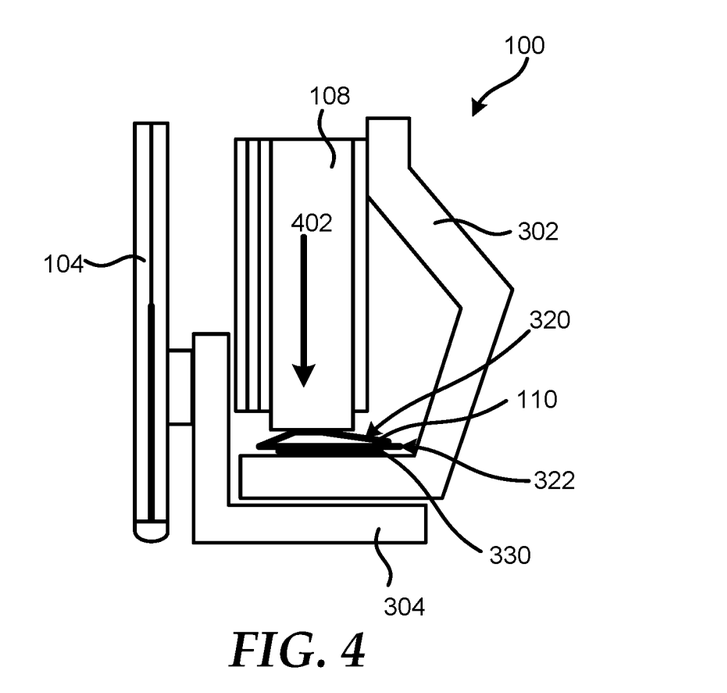

FIGS. 3 and 4 illustrate a portion of display 100 according to at least one embodiment of the present disclosure. Display 100 includes a cover bottom 302, guide panel 304, display panel 104, LGP 108, and damper 110. Damper 110 includes a compression portion 320 and a catch portion 322. In certain examples, FIG. 3 illustrates a cross section of display 100 when in a landscape orientation, and FIG. 4 illustrates a cross section of the display when in a pivot position or portrait orientation.

In an example, damper 110 may be secured to cover bottom 302 in any suitable manner, such as an adhesive material 330. In certain examples, adhesive material 330 may be any suitable adhesive, such as a glue, double sided tape, or the like. Adhesive material 330 may hold damper 110 in a proper orientation or alignment to provide support to LGP 108 when display 100 is in a pivot position or portrait orientation as illustrated in FIG. 4. In an example, while display 100 is in the landscape orientation of FIG. 3, damper 110 may be in physical communication with LGP 108 without a substantial force being exerted on the damper. In this example, compression portion 320 of damper 110 may be in an initial position, such that an end of the compression in not in physical communication with catch portion 322.

Referring now to FIG. 4, when display 100 is in a pivot position or portrait orientation gravity may exert a force on LGP 108 in the direction of arrow 402. In response to the force of gravity, LGP 108 may exert a force on damper 110 in the direction of arrow 402. Based on the force exerted on compression portion 320 of damper 110, compression portion may deform, and an end of the compression portion may be placed in physical communication with catch portion 322 as shown in FIG. 4.

In an example, the end of compression portion 320 may interface with a groove of catch portion 322 based on the deforming of the compression portion. In this example, the groove of catch portion 322 may stop the end of compression portion 320 and as a result damper 110 may hold LGP 108 in a proper location with respect to LEDs as will be described with respect to FIG. 8 below. In certain examples, different environmental conditions around display 100 may change how compression portion 320 reacts to the force exerted by LGP 108. In an example, if display 100 is in a high temperature or high humidity environment, compression portion 320 may deform more than in normal conditions. In this situation, the end of compression portion 320 may interface with a different groove of catch portion 322. This other groove may enable a smooth transition of damper 110 from the initial position to a compressed position. Thus, compression portion 320 and the different grooves on catch portion 322 may enable damper 110 to support and hold LGP 108 in a proper location while display 100 is in a pivot position or portrait orientation.

Figure 5:
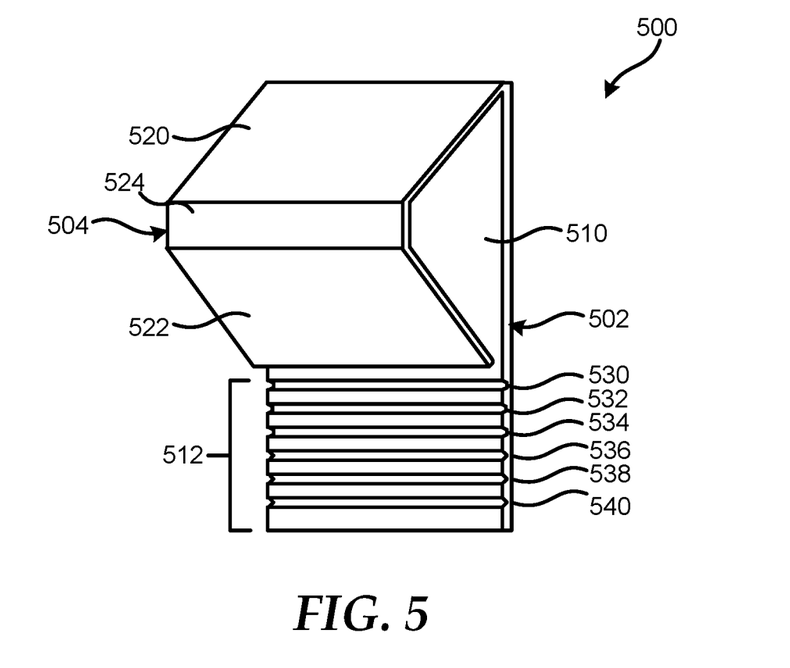
FIGS. 5-7 are diagrams of a damper for a display according to at least one embodiment of the present disclosure.
Figure 6:
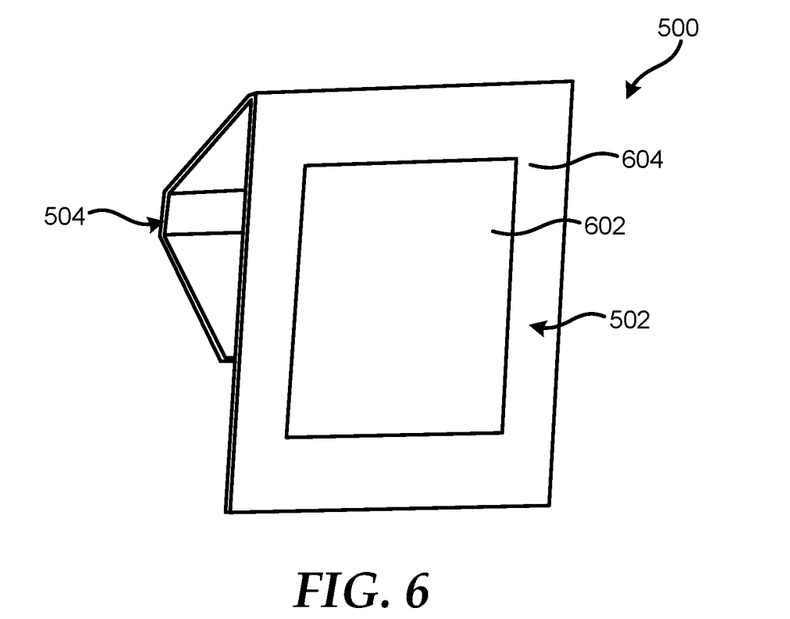
Figure 7:
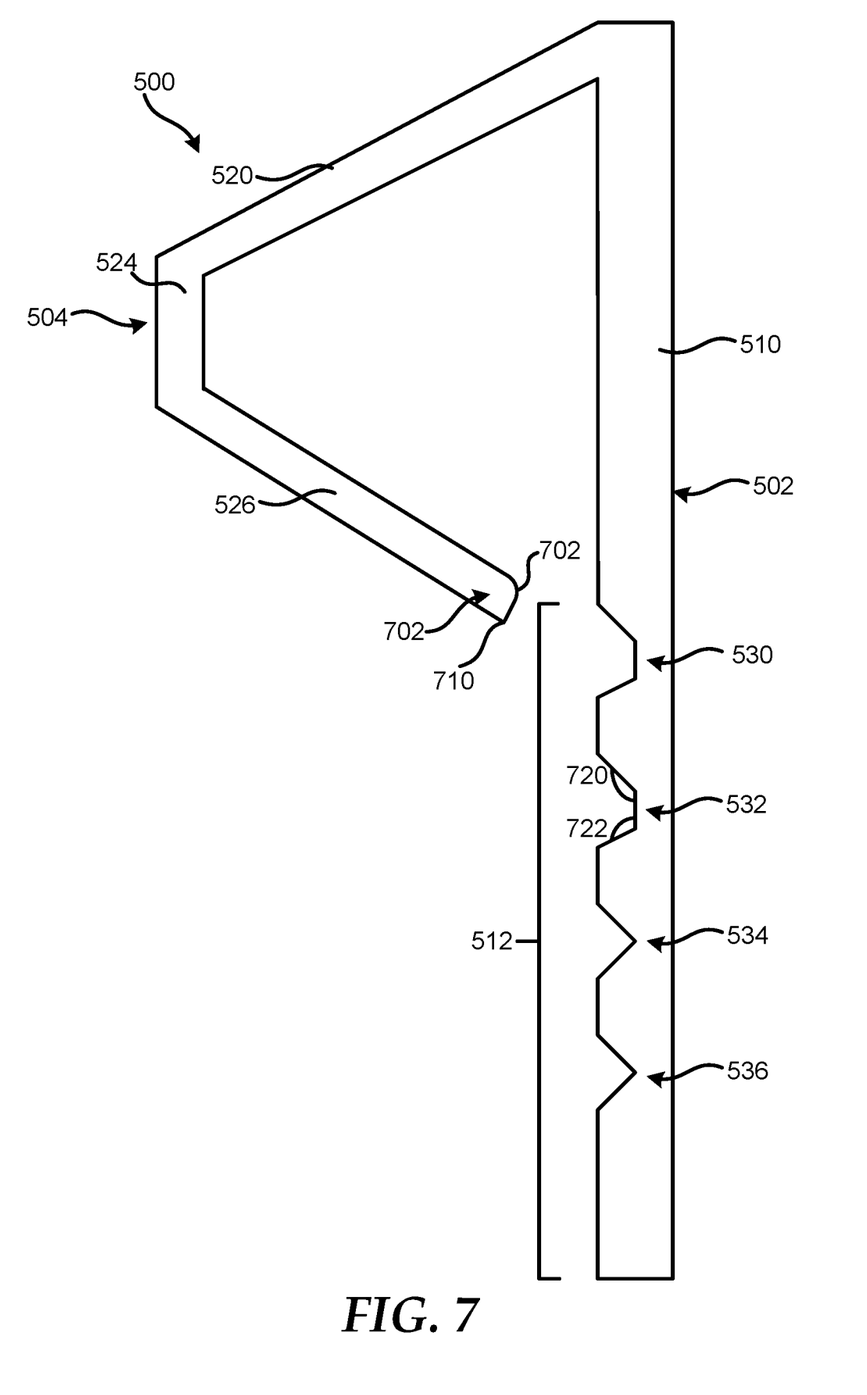

FIGS. 5-7 a damper 500 for a display, such as display 100 of FIGS. 1-3, according to at least one embodiment of the present disclosure. Damper 500 may be substantially similar to damper 110 of FIGS. 1-4. Damper 500 includes a base 502 and a compression portion 504. Base 502 includes a main portion 510 and a catch portion 512. Compression portion 504 includes support portions 520 and 522 and a contact portion 524. Catch portion 512 includes multiple grooves 530, 532, 534, 536, 538, and 540 (530-540). While damper 500 is illustrated with six grooves in FIG. 5, the damper may include any suitable number of grooves without varying from the scope of this disclosure. In an example, damper 500 may be any suitable material to support an LGP, such as LGP 108 of FIGS. 1-4, such as metal, reinforced plastic, or the like. In certain examples, support portion 522 may interface with a different one of grooves 530-540 to support the LGP while display 100 is in the pivot position or portrait orientation.

Referring now to FIG. 6, damper 500 includes an adhesive material 602 on a back surface 604 of base 502. In an example, adhesive material 602 may be utilized to secure damper 500 within a display to enable the damper to support an LGP of the display. Compression portion 504 may be any suitable shape to provide a proper amount of support to an LGP, such as a trapezoid as shown in FIGS. 5-7.

Referring now to FIG. 7, compression portion 504 includes an end 702 that is opposite contact portion 524. End 702 includes two corners 710 and 702. In an example, corners 710 and 712 may have the same shape. In another example, corners 710 and 712 may have different shapes as shown in FIG. 7. For example, corner 710 may have a square or right-angle shape, and corner 712 may have a rounded shape.

For clarity and brevity, only a subset of grooves 530-540 are illustrated in FIG. 7. For example, catch portion 512 includes grooves 530, 532, 536, and 538. In an example, grooves 530 and 532 may be a first type of groove with a first shape, and grooves 536 and 538 may be a second type of groove with a second shape. For example, grooves 530 and 532 may be a trapezoidal type of groove with a trapezoid shape, and grooves 536 and 538 may be a triangular type with a triangle shape.

In an example, each trapezoidal groove, such as grooves 530 and 532, may have two angles 720 and 722. Angle 720 may be larger than angle 722, such that angle 720 may enable end 702 to easily enter groove 532 and angle 722 may provide a holding force on end 702. In certain examples, the rounded shape of corner 712 may further enable a better entry of end 702 within groove 532. Based on the physical communication between end 702 and a surface of groove 532, damper 500 may exert a force to support and hold an LGP of a display in a proper alignment with LEDs of the display.

As shown in FIG. 7, triangular grooves 536 and 538 may be further from end 702 as compared to trapezoidal grooves 530 and 532 when compression portion 504 is in an initial position. In certain examples, trapezoidal grooves 530 and 532 may sufficiently support LGP while the display is in a pivot position or portrait orientation and normal environmental conditions are present. In an example, triangular grooves 536 and 538 may enable damper 500 to be smoothly pressed while a display is within high temperature or high humidity conditions. Thus, grooves 530 and 532 may enable compression portion 504 to provide proper support for an LGP under certain environmental conditions and grooves 536 and 538 may provide support under different environmental conditions. As described herein, damper 110 of FIGS. 1-4 and substantially similar damper 500 of FIGS. 5-7 may support an LGP to maintain proper alignment with LEDs and prevent hot spots in a display panel of the display.

Figure 8:
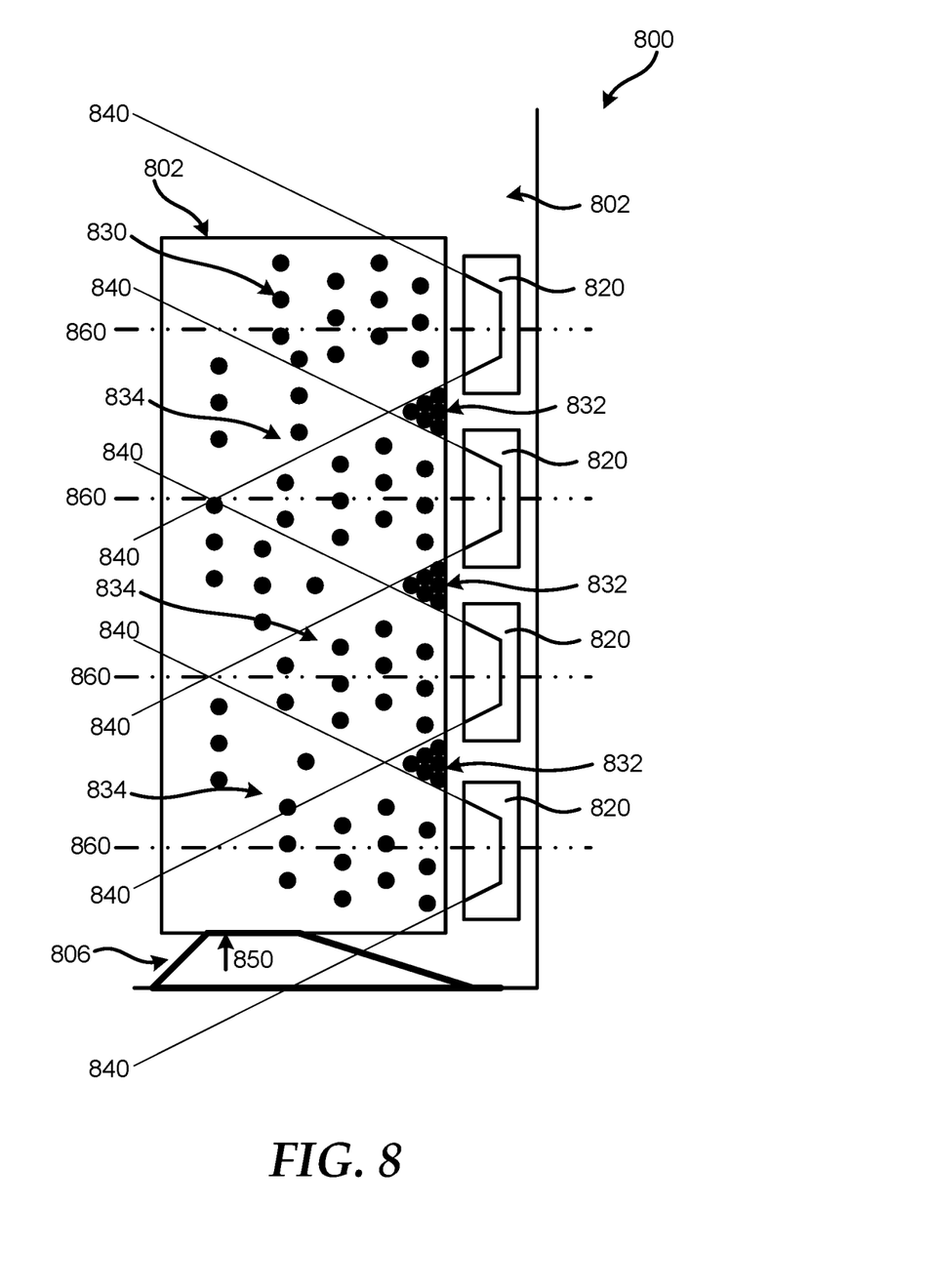
FIG. 8 is a cross-sectional view a light guide plate, a light emitting diode, and a damper of a display according to at least one embodiment of the present disclosure.

FIG. 8 illustrates a portion of a display 800 according to at least one embodiment of the present disclosure. Display 800 include a LGP 802, a panel 804, and a damper 806. Display 800 may be substantially similar to display 100 of FIGS. 1-4. Display 800 further includes multiple LEDs 820 within panel 804. LPG 802 includes multiple components 830 to reflect light from LEDs 820. In certain examples, components 830 may be grouped in areas of different densities. For example, components 830 may be situated in dense pattern areas 832 and lighter pattern areas 834.

In an example, each LED 820 may have a range of light projection indicated by lines 840. The different component pattern areas 832 and 834 may be utilized to create an even distribution of light within LGP 802. In an example, damper 806 may exert a force in the direction of arrow 850 to hold LGP 802 in a proper location such that dense pattern areas 832 are outside the light projection ranges 840 of LEDs 820. In this example, this alignment may keep the middle of each LED 820 within a middle portion of lighter pattern areas 834 as indicated by dashed lines 860. In certain examples, damper 806 may provide the support to LGP 802 when display 800 is in a pivot position or portrait orientation to prevent hot spots within the LGP and associated display panel.

Figure 9:
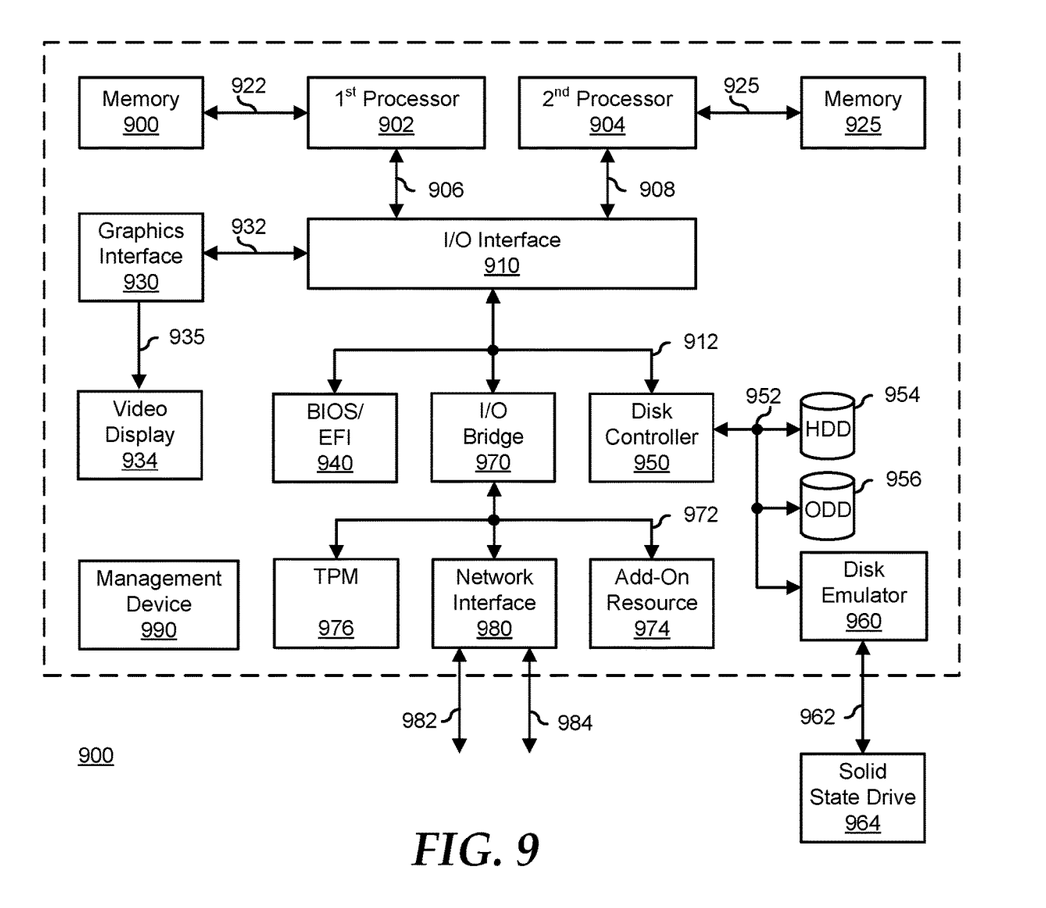
FIG. 9 is a block diagram of a general information handling system according to an embodiment of the present disclosure.

FIG. 9 shows a generalized embodiment of an information handling system 900 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described below and operates to perform one or more of the methods described below. Information handling system 900 includes a processors 902 and 904, an input/output (I/O) interface 910, memories 920 and 925, a graphics interface 830, a basic input and output system/universal extensible firmware interface (BIOS/UEFI) module 840, a disk controller 850, a hard disk drive (HDD) 954, an optical disk drive (ODD) 956, a disk emulator 960 connected to an external solid state drive (SSD) 962, an I/O bridge 970, one or more add-on resources 974, a trusted platform module (TPM) 976, a network interface 980, a management device 990, and a power supply 995. Processors 902 and 904, I/O interface 910, memory 920, graphics interface 930, BIOS/UEFI module 940, disk controller 950, HDD 954, ODD 956, disk emulator 960, SSD 962, I/O bridge 970, add-on resources 974, TPM 976, and network interface 980 operate together to provide a host environment of information handling system 900 that operates to provide the data processing functionality of the information handling system. The host environment operates to execute machine-executable code, including platform BIOS/UEFI code, device firmware, operating system code, applications, programs, and the like, to perform the data processing tasks associated with information handling system 900.

In the host environment, processor 902 is connected to I/O interface 910 via processor interface 906, and processor 904 is connected to the I/O interface via processor interface 908. Memory 920 is connected to processor 902 via a memory interface 922. Memory 925 is connected to processor 904 via a memory interface 927. Graphics interface 930 is connected to I/O interface 910 via a graphics interface 932 and provides a video display output 936 to a video display 934. In a particular embodiment, information handling system 900 includes separate memories that are dedicated to each of processors 902 and 904 via separate memory interfaces. An example of memories 920 and 930 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 940, disk controller 950, and I/O bridge 970 are connected to I/O interface 910 via an I/O channel 912. An example of I/O channel 912 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 910 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 940 includes BIOS/UEFI code operable to detect resources within information handling system 900, to provide drivers for the resources, initialize the resources, and access the resources. BIOS/UEFI module 940 includes code that operates to detect resources within information handling system 900, to provide drivers for the resources, to initialize the resources, and to access the resources.

Disk controller 950 includes a disk interface 952 that connects the disk controller to HDD 954, to ODD 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits SSD 964 to be connected to information handling system 900 via an external interface 962. An example of external interface 962 includes a USB interface, an IEEE 3394 (Firewire) interface, a proprietary interface, or a combination thereof. Alternatively, solid-state drive 964 can be disposed within information handling system 900.

I/O bridge 970 includes a peripheral interface 972 that connects the I/O bridge to add-on resource 974, to TPM 976, and to network interface 980. Peripheral interface 972 can be the same type of interface as I/O channel 912 or can be a different type of interface. As such, I/O bridge 970 extends the capacity of I/O channel 912 when peripheral interface 972 and the I/O channel are of the same type, and the I/O bridge translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as I/O interface 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Management device 990 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 900. In particular, management device 990 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 900, such as system cooling fans and power supplies. Management device 990 can include a network connection to an external management system, and the management device can communicate with the management system to report status information for information handling system 900, to receive BIOS/UEFI or system firmware updates, or to perform other task for managing and controlling the operation of information handling system 900.

Management device 990 can operate off of a separate power plane from the components of the host environment so that the management device receives power to manage information handling system 900 when the information handling system is otherwise shut down. An example of management device 990 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 990 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A display for an information handling system, the display comprising:
    a light guide plate;
    a bottom cover; and
    a damper in physical communication with the light guide plate and with the bottom cover, the damper including:
        a compression portion to deform in response to a force exerted on the compression portion by the light guide plate; and
        a catch portion including a first groove to interface with an end of the compression portion during a first environmental condition, and to hold the end of the compression portion and support the light guide plate when the display is in a pivot position during the first environmental condition.

2. The display of claim 1, wherein the damper further includes a second groove to interface with the end of the compression portion during a second environmental condition.

3. The display of claim 2, wherein the second environmental condition is a high temperature or high humidity condition.

4. The display of claim 2, wherein the first groove has a first shape and the second groove has a second shape.

5. The display of claim 2, wherein the second groove is located further from the end of the compression portion than the first groove when the damper is in an initial position.

6. The display of claim 1, wherein the end of the compression portion includes first and second corners, wherein the first corner is a different shape than the second corner.

7. The display of claim 1, wherein the damper is secured to the bottom cover via an adhesive material.

8. The display of claim 1, wherein the damper is made from a reinforced plastic material.

9. A display for an information handling system, the display comprising:
- a light guide plate;
- a plurality of light emitting diodes located along a first edge of the light guide plate, the light emitting diodes to illuminate the light guide plate;
- a bottom cover; and
- a damper in physical communication with the light guide plate and with the bottom cover, the damper including:
  - a compression portion to deform in response to a force exerted on the compression portion by the light guide plate; and
  - a catch portion including a first groove to interface with an end of the compression portion during a first environmental condition, and to hold the end of the compression portion and support the light guide plate when the display is in a pivot position during the first environmental condition.

10. The display of claim 9, wherein the damper further includes a second groove to interface with the end of the compression portion during a second environmental condition.

11. The display of claim 10, wherein the second environmental condition is a high temperature or high humidity condition.

12. The display of claim 10, wherein the first groove has a first shape and the second groove has a second shape.

13. The display of claim 10, wherein the second groove is located further from the end of the compression portion than the first groove when the damper is in an initial position.

14. The display of claim 9, wherein the damper holds the light guide plate in proper alignment with the light emitting diodes while the display is in the pivot position.

15. The display of claim 9, wherein the end of the compression portion includes first and second corners, wherein the first corner is a different shape than the second corner.

16. The display of claim 9, wherein the damper is secured to the bottom cover via an adhesive material.

17. A display for an information handling system, the display comprising:
- a light guide plate;
- a bottom cover; and
- a damper in physical communication with the light guide plate and with the bottom cover, the damper including:
  - a compression portion to deform in response to a force exerted on the compression portion by the light guide plate, wherein an end of the compression portion includes first and second corners, wherein the first corner is a different shape than the second corner; and
  - a catch portion including a first groove to interface with the end of the compression portion during a first environmental condition, and to retain the first corner of the end of the compression portion and support the light guide plate when the display is in a pivot position during the first environmental condition.

18. The display of claim 17, wherein the damper further includes a second groove to interface with the end of the compression portion during a second environmental condition.

19. The display of claim 18, wherein the second environmental condition is a high temperature or high humidity condition.

20. The display of claim 18, wherein the first groove has a first shape and the second groove has a second shape.

* * * * *